(12) United States Patent
Cocchi et al.

(10) Patent No.: US 10,993,458 B2
(45) Date of Patent: May 4, 2021

(54) MACHINE FOR MAKING LIQUID OR SEMI-LIQUID PRODUCTS OF THE ICE CREAM SECTOR

(71) Applicant: ALI GROUP S.r.l.—CARPIGIANI, Cernusco Sul Naviglio (IT)

(72) Inventors: Andrea Cocchi, Calderara di Reno (IT); Roberto Lazzarini, Reggio Emilia (IT)

(73) Assignee: ALI GROUP S.R.L.—CARPIGIANI, Cernusco Sul Naviglio (IT)

( * ) Notice: Subject to any disclaimer, the term of this patent is extended or adjusted under 35 U.S.C. 154(b) by 457 days.

(21) Appl. No.: 15/982,440

(22) Filed: May 17, 2018

(65) Prior Publication Data
US 2018/0368437 A1   Dec. 27, 2018

(30) Foreign Application Priority Data

Jun. 22, 2017   (IT) .................. 102017000069604

(51) Int. Cl.
| | |
|---|---|
| A23G 9/12 | (2006.01) |
| A23G 9/22 | (2006.01) |
| A23G 9/20 | (2006.01) |
| A23G 9/28 | (2006.01) |
| A23G 9/40 | (2006.01) |
| A23G 9/42 | (2006.01) |
| A23G 9/52 | (2006.01) |
| F25D 11/00 | (2006.01) |

(52) U.S. Cl.
CPC .............. *A23G 9/12* (2013.01); *A23G 9/20* (2013.01); *A23G 9/22* (2013.01); *A23G 9/28* (2013.01); *A23G 9/40* (2013.01); *A23G 9/42* (2013.01); *A23G 9/52* (2013.01); *F25D 11/00* (2013.01)

(58) Field of Classification Search
CPC ... A23G 9/12; A23G 9/20; A23G 9/22; A23G 9/28; A23G 9/40; A23G 9/42; A23G 9/52; A47J 31/3619; A47J 31/41; A47J 31/40; A47J 31/3695; A47J 31/4467; A47J 31/369
USPC ......... 99/279, 280, 285, 286, 287, 291, 295, 99/300, 304, 307, 323, 455, 495
See application file for complete search history.

(56) References Cited

U.S. PATENT DOCUMENTS

| | | | |
|---|---|---|---|
| 2003/0089245 A1 | 5/2003 | Kollep et al. | |
| 2009/0223374 A1* | 9/2009 | Morin | A47J 31/3619 99/287 |
| 2011/0277642 A1 | 11/2011 | Mariller | |

FOREIGN PATENT DOCUMENTS

| | | |
|---|---|---|
| EP | 2792282 A1 | 10/2014 |
| EP | 3081093 A1 | 10/2016 |

(Continued)

OTHER PUBLICATIONS

Italian Search Report dated Jan. 11, 2018 from counterpart App No. IT 201700069604.

*Primary Examiner* — Phuong T Nguyen
(74) *Attorney, Agent, or Firm* — Shuttleworth & Ingersoll, PLC; Timothy Klima

(57) ABSTRACT

A unit for receiving and treating capsules containing a basic preparation for an ice cream product includes: a housing configured to receive a capsule containing a basic preparation for an ice cream product; and an unloading device adapted to trigger expulsion of the capsule from the housing. The unloading device includes an impact portion adapted to engage the capsule and a locking portion configured to lock the unloading device to the unit.

12 Claims, 3 Drawing Sheets

(56) References Cited

FOREIGN PATENT DOCUMENTS

| EP | 3141166 A1 | 3/2017 |
| EP | 3158872 A1 | 4/2017 |
| WO | WO2006069801 A1 | 7/2006 |
| WO | WO2007031378 A2 | 3/2007 |
| WO | WO2016146793 A1 | 9/2016 |

* cited by examiner

MACHINE FOR MAKING LIQUID OR SEMI-LIQUID PRODUCTS OF THE ICE CREAM SECTOR

This application claims priority to Italian Patent Application 102017000069604 filed Jun. 22, 2017, the entirety of which is incorporated by reference herein.

BACKGROUND OF THE INVENTION

This invention relates to the field of the production of liquid and semi-liquid products for the ice cream sector.

In particular, this invention relates to a unit for receiving and treating capsules containing a basic preparation for an ice cream product, for example, containing a basic preparation for an ice cream product.

As is known, a need which is strongly felt in this sector is that of being able to make ice cream type products in small portions very quickly and to a customer's individual request.

In effect, customers often demand to be able to have food products made on the spot to their specifications.

A need which is felt particularly strongly by machine manufacturers is that of having a machine capable of making liquid and semi-liquid products of the ice cream sector in very small quantities (single portions) and which is particularly simple and reliable.

Another particularly strongly felt need in the sector in question is the need for a machine which allows reducing the risks of product contamination, thus increasing food safety.

SUMMARY OF THE INVENTION

In this context, the technical purpose which forms the basis of the present invention is to propose a unit for receiving and treating capsules containing a basic preparation for an ice cream product to overcome at least some of the disadvantages of the prior art.

In particular, this invention has for an aim to provide a unit for receiving and treating capsules containing a basic preparation for an ice cream product, where the unit is capable of controlling the movement, specifically the expulsion, of a capsule in a highly efficient and automated manner, thereby also reducing the risk of product contamination.

The technical purpose indicated and the aims specified are substantially achieved by a unit for receiving and treating capsules containing a basic preparation for an ice cream product, comprising the technical features described in one or more of the accompanying claims.

According to this invention, a unit for receiving and treating capsules containing a basic preparation for an ice cream product comprises: a housing configured to receive a capsule containing a basic preparation for an ice cream product; an unloading device adapted to trigger expulsion of the capsule from the housing.

The unloading device comprises an impact portion adapted to engage the capsule and a locking portion configured to lock the unloading device to the unit.

BRIEF DESCRIPTION OF THE DRAWINGS

Further features and advantages of the present invention are more apparent in the non-limiting description below, with reference to a preferred but non-exclusive embodiment of a unit for receiving and treating capsules containing a basic preparation for an ice cream product, as illustrated in the accompanying drawings, in which.

DESCRIPTION OF THE PREFERRED EMBODIMENTS

Figure 1:
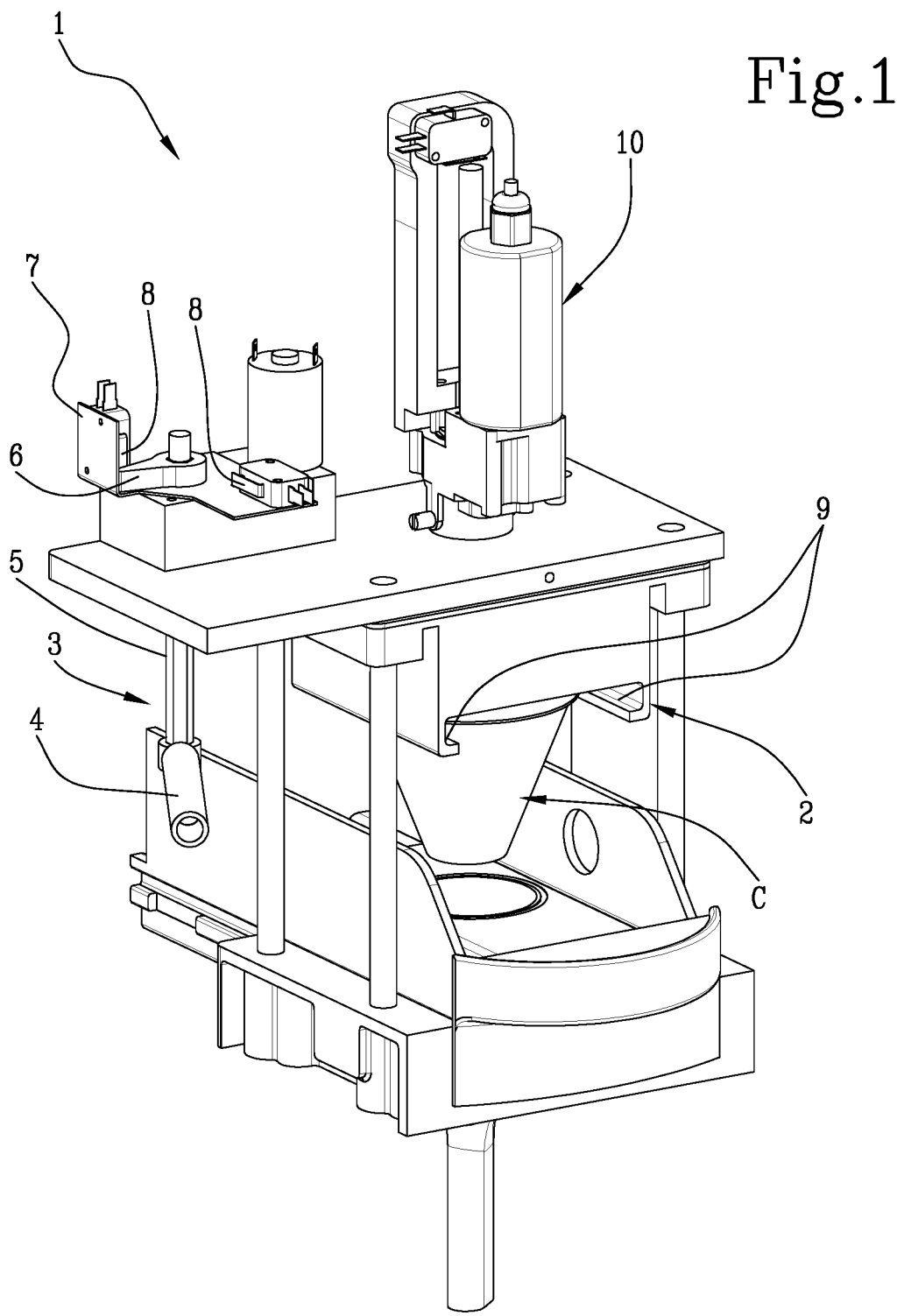
FIG. 1 shows a unit for receiving and treating capsules containing a basic preparation for an ice cream product.
Figure 2:
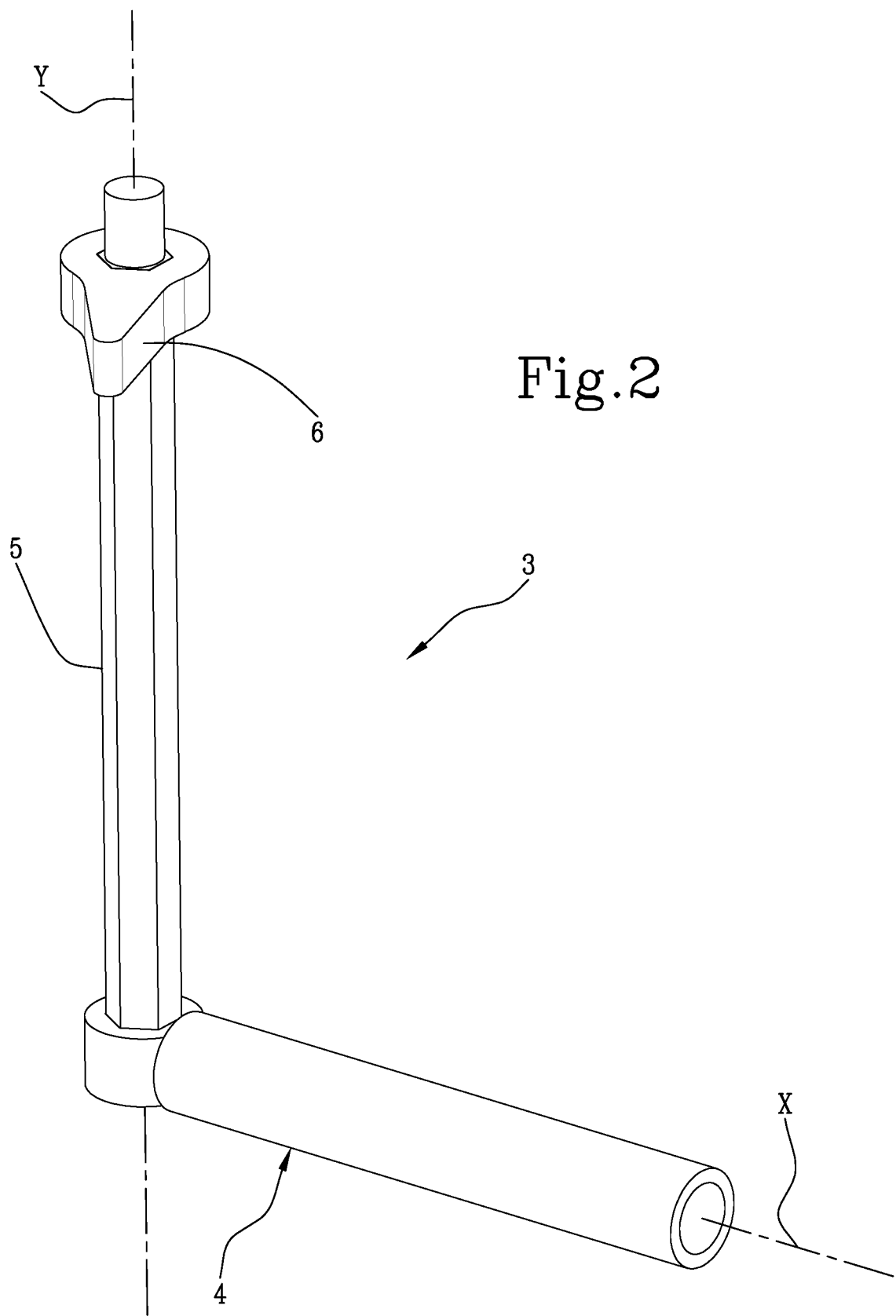
FIG. 2 shows a detail of an unloading device of a unit for receiving and treating capsules.
Figure 3:
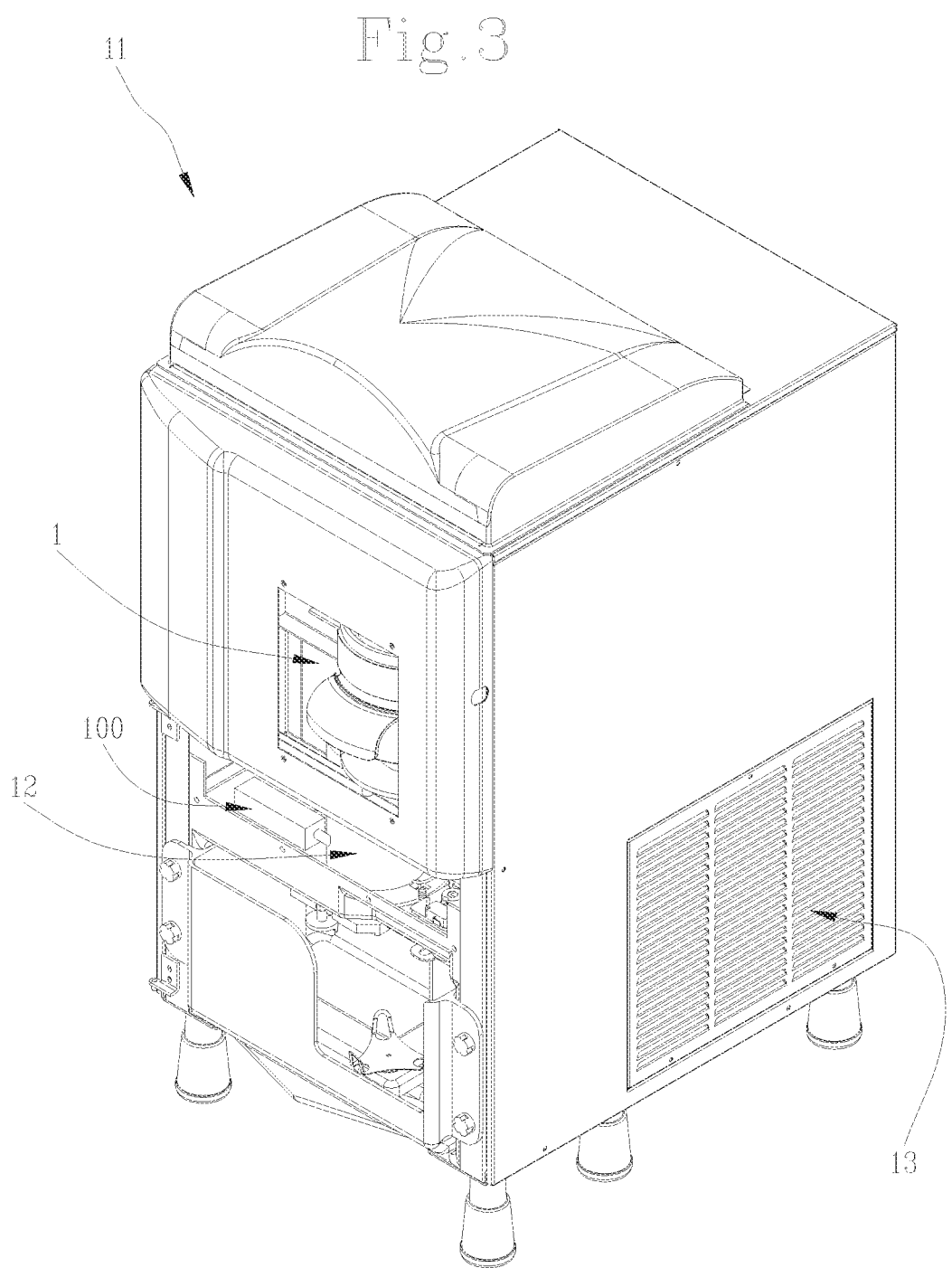
FIG. 3 shows a machine for making liquid and/or semi-liquid products of the ice cream sector, comprising a unit for receiving and treating capsules.

With reference to the accompanying drawings, the numeral 1 denotes a unit for receiving and treating capsules containing a basic preparation for an ice cream product such as for example: soft ice cream, artisan gelato, sorbets, slush and the like.

In the context of the invention, the term "ice cream" is used to mean a food preparation which is based on milk or milk-derived products and to which fruit, aromatics or other ingredients are added to obtain different flavors.

The unit 1 comprises:

a housing 2 configured to receive a capsule "C" containing a basic preparation for an ice cream product;

an unloading device 3 adapted to trigger expulsion of the capsule C from the housing.

The unloading device 3 in turn comprises an impact portion 4 and a locking portion 5.

The locking portion 5 is configured to lock the unloading device 3 to the unit 1, while the impact portion 4 is configured to engage the capsule "C".

In other words, the unit 1 comprises a housing in which a capsule "C" containing a basic preparation for an ice cream product can be accommodated. Once the content of the capsule "C" has been removed and used in a process for the production of an ice cream product, the capsule "C" must be properly removed from the housing 2 so that the empty capsule "C" can be disposed of and to make room for another capsule "C".

The capsule "C" is expelled from the housing 2 by operation of the unloading device 3 whose function is, precisely, that of triggering the removal of the capsule "C" from the housing in a rapid and efficient manner and, above all, allowing this to be done without requiring the intervention of an operator.

Advantageously, a unit 2 according to this invention allows guaranteeing a high level of efficiency and automation, eliminating the risk of accidentally contaminating the product during production.

In particular, the unloading device 3 is configured to drive the impact portion 4 to collide with the capsule "C" thereby imparting an impulsive thrust which expels the capsule from the housing 2.

In other words, the impact portion 4 applies an impulsive force on the capsule "C", thereby maximizing the force applied and ensuring that the capsule "C" is correctly expelled, that is to say, eliminating the risk of malfunctioning and jamming which would require the intervention of an operator to complete the expulsion procedure.

Preferably, the impact portion 4 has a substantially cylindrical shape along an axis of extension "X" lying in a movement of the impact portion.

Further, the impact portion 4 is keyed to the locking portion 5 which also has a substantially cylindrical shape, but extending along an axis of extension "Y" perpendicular to the axis of extension "X".

Preferably, the impact portion 4 comprises a covering sheath and still more preferably, the sheath is made of rubber.

Preferably, the impact portion 4 is elastically deformable (that is, flexible).

In other words, the impact portion 4 is adapted to be elastically deformed following an elastic impact (and is configured to return to a predetermined balanced configuration).

Preferably, the impact portion 4 internally houses a spring (not illustrated) adapted to allow the return to the predetermined balanced configuration after impact.

The unloading device 3 is configured to adopt a rest position where the impact portion 4 is distal from the portion of space occupiable by the capsule "C" when it is inside the housing 2 and an unloading position where the impact portion 4 is located at least partly inside the portion of space occupiable by the capsule "C" when it is inside the housing 2.

In other words, the impact portion 4 is moved between a position where it does not interfere with the capsule "C" and a position where it engages the capsule "C" and applies an impulsive force which causes it to drop out.

To ensure the movement is correct, the unloading device 3 comprises a limit stop element 6, preferably keyed to the locking portion 5.

The limit stop element is 6 configured to define a maximum length of travel of the unloading device between the rest position and the unloading position.

The limit stop element 6 ensures that the impact portion is moved correctly from the rest position to the unloading position and vice versa, ensuring that it does not erroneously interact with other parts either of the unit 1 or of any device the unit 1 may be installed in.

The unloading device 3 also comprises an actuator 7 configured to drive the unloading device 4 between the two positions.

The actuator 7 comprises a pair of abutment surfaces 8 against which the limit stop element 6 comes into abutment.

To be able to optimize the process of loading the capsule "C", the unit 1 comprises a movable loading element, not illustrated in the accompanying drawings, movable between an extracted position for loading the capsule "C" and an insertion position where the capsule "C" is inserted into the housing 2.

More specifically, once the capsule "C" has been inserted into the housing 2, the edge of its upper wall is locked to guides 9 which block the capsule "C" in a position where it can slide only along an expulsion direction following its collision with the impact portion 4.

The unit 1 also comprises a dispensing unit 10 equipped with at least one element which comes into contact with an upper wall of the capsule "C".

The contact element is movable between a spaced-apart position relative to the capsule "C" and a contact and compression position where the contact element applies pressure on the upper wall of the capsule "C", causing it to be compressed.

In particular, the unit 1 comprises an actuator 10a of the dispensing unit, configured to move the dispensing unit 10 to drive it between the spaced-apart position and the contact and compression position and vice versa.

This invention also has for an object a machine 11 for making liquid and/or semi-liquid products of the ice cream sector, comprising:

a unit 1 for receiving and treating capsules containing a basic preparation for an ice cream product, as described in the foregoing;

a processing container 12 forming a processing chamber;

a stirrer mounted inside the processing chamber;

a cooling system 1, provided with at least one heat exchanger associated with the processing container for exchanging heat therewith and cooling it;

a diluting liquid injection device 100 for injecting a diluting liquid into the processing container.

The machine 11, in the more general aspects of it, is for example of the type described in invention patent application EP3158872 in the name of ALI S.p.A. —CARPIGIANI GROUP, which is incorporated herein by reference.

According to another aspect, also defined is a method for making liquid or semi-liquid products in a machine for making liquid and/or semi-liquid products of the ice cream sector (of the type described above), comprising an initial step of preparing a machine for making liquid and/or semi-liquid products of the ice cream sector, as described in the foregoing.

This is followed by a step of loading into the housing 2 of the unit 1 a capsule "C" containing a basic preparation, such as, for example, a basic preparation for an ice cream product.

More specifically, the next step is to extract the movable loading element so that the capsule "C" can be inserted into the housing 2, specifically by inserting the edge of the upper wall of the capsule "C" into the guides 9, in such a way that the capsule "C" can move only in the expulsion direction.

After that, by activating the dispensing unit, the capsule is opened and compressed so as to squeeze the basic preparation out of it and the basic preparation is transferred from the capsule "C" into the processing container 12.

When all of the basic preparation has been transferred, there is a step of feeding a diluting liquid into the container 12.

Next, the basic preparation is stirred in order to mix the diluting liquid into it by means of the stirrer located in the processing chamber.

At the same time, the mixture of basic preparation and diluting liquid is cooled to a temperature of between −15° C. and −2° C. so as to make a portion of ice cream.

Lastly, the unloading device 3 is activated in such a way as to trigger expulsion of the capsule C from the housing 2.

More specifically, the step of activating comprises a step of driving the actuator 7 to cause the impact portion 4 of the unloading device 3 to move from the rest position to the unloading position.

Moving the impact portion 4 causes it to engage (come into abutment with) the capsule "C" contained in the housing 2 in a step of imparting an impulsive force to the capsule "C" in such a way as to expel it from the housing 2 immediately.

By "impulsive force" is meant a strong force applied for a short length of time.

The process is concluded by a step of bringing the impact portion 4 of the unloading device 3 back to the rest position.

Advantageously, a unit 1 for treating capsules containing a basic preparation for an ice cream product, made according to this invention allows ensuring that the capsule "C" is removed correctly after being emptied of its contents, without requiring direct manual intervention by an operator, thanks to an unloading device 3 which allows automating and increasing the efficiency of the process.

That way, it is also possible to ensure that the possible risks of contaminating the product during the production process are eliminated.

What is claimed is:

1. A machine for making liquid or semi-liquid products of the ice cream sector comprising:
   a unit for receiving and treating capsules containing a basic preparation for an ice cream product, comprising:
      a housing configured to receive a capsule containing a basic preparation for an ice cream product;
      an unloading device adapted to trigger expulsion of the capsule from the housing, the unloading device comprising an impact portion adapted to engage the capsule and a locking portion configured to lock the unloading device to the unit;
   a processing container forming a processing chamber for making an ice cream product;
   a stirrer mounted inside the processing chamber;
   a cooling system provided with at least one heat exchanger associated with the processing container, to exchange heat with the processing container to cool the processing container;
   an injection device for injecting a dilution liquid, associated with the processing container, for injecting the dilution liquid into the processing container.

2. The machine according to claim 1, wherein the unloading device is configured to drive the impact portion to collide with the capsule thereby imparting an impulsive force which expels the capsule from the housing.

3. The machine according to claim 1, wherein the unloading device is configured to adopt a rest position where the impact portion is distal from the portion of space occupiable by the capsule when it is inside the housing and an unloading position where the impact portion is located at least partly inside the portion of space occupiable by the capsule when it is inside the housing.

4. The machine according to claim 3, wherein the unloading device comprises a limit stop element configured to define a maximum length of travel of the unloading device between the rest position and the unloading position.

5. The machine according to claim 3, wherein the unloading device comprises an actuator configured to drive the unloading device between the rest position and the unloading position.

6. The machine according to claim 1, wherein the housing comprises guides adapted to receive an upper edge portion of the capsule, the guides being configured to constrain the capsule to move along an expulsion direction.

7. The machine according to claim 1, wherein the impact portion of the unloading device comprises a covering sheath, the sheath being made preferably of rubber.

8. The machine according to claim 1, wherein the housing comprises a movable loading element, the movable loading element being movable between an extracted position for loading the capsule and an insertion position where the capsule is inserted into the housing.

9. The machine according to claim 1, comprising a dispensing unit equipped with at least one element which comes into contact with an upper wall of the capsule and which is movable between a spaced-apart position where it is spaced from the capsule and a contact and compression position where it compresses the upper wall of the capsule.

10. The machine according to claim 9, comprising an actuator of the dispensing unit, operatively associated with the dispensing unit to drive the dispensing unit between the spaced-apart position and the contact and compression position.

11. A method for making liquid or semi-liquid products in a machine for making liquid or semi-liquid products of the ice cream sector comprising the following steps:
   preparing a machine for making liquid or semi-liquid products of the ice cream sector comprising:
      a receiving and treating unit for receiving and treating capsules containing a basic preparation for an ice cream product, comprising:
         a housing configured to receive a capsule containing a basic preparation for an ice cream product;
         an unloading device adapted to trigger expulsion of the capsule from the housing, the unloading device comprising an impact portion adapted to engage the capsule and a locking portion configured to lock the unloading device to the unit;
      a processing container forming a processing chamber for making an ice cream product;
      a stirrer mounted inside the processing chamber;
      a cooling system provided with at least one heat exchanger associated with the processing container, to exchange heat with the processing container to cool the processing container;
      an injection device for injecting a dilution liquid, associated with the processing container, for injecting the dilution liquid into the processing container;
   inserting the capsule containing the basic preparation into the housing of the receiving and treatment unit;
   transferring the basic preparation from the capsule to the processing container;
   feeding the dilution liquid into the processing container;
   stirring and mixing the basic preparation and the dilution liquid with the stirrer, and simultaneously cooling the basic preparation and the dilution liquid to a temperature between −2° C. and −15° C. so as to make a portion of ice cream;
   activating the unloading device to trigger expulsion of the capsule from the housing.

12. The method according to claim 11, wherein the step of activating the unloading device comprises a step of:
   driving the actuator to cause the impact portion of the unloading device to move from a rest position to an unloading position;
   imparting an impulsive force to the capsule through collision with the impact portion causing the capsule to be expelled from the housing;
   bringing the impact portion of the unloading device back to the rest position.

* * * * *